United States Patent
Kambe et al.

(10) Patent No.: US 6,322,349 B1
(45) Date of Patent: Nov. 27, 2001

(54) MOLD FOR INJECTION COMPRESSION MOLDING

(75) Inventors: Takahide Kambe; Yukio Horaoku, both of Gifu-ken (JP)

(73) Assignee: Kata Systems Company, Gifu-Ken (JP)

( * ) Notice: Subject to any disclaimer, the term of this patent is extended or adjusted under 35 U.S.C. 154(b) by 0 days.

(21) Appl. No.: 09/533,891

(22) Filed: Mar. 22, 2000

(30) Foreign Application Priority Data

Apr. 7, 1999 (JP) .................................................. 11-100257

(51) Int. Cl.⁷ ...................................................... B29C 45/56
(52) U.S. Cl. ........................ 425/547; 264/314; 264/328.7; 425/405.1; 425/552
(58) Field of Search ..................................... 264/313, 314, 264/328.7; 425/405.1, 547, 552

(56) References Cited

U.S. PATENT DOCUMENTS

| | | | |
|---|---|---|---|
| 1,689,533 | * 10/1928 | Parker | 425/405.1 |
| 3,660,002 | * 5/1972 | Morroni | 425/405.1 |
| 5,204,042 | * 4/1993 | James et al. | 264/313 |

* cited by examiner

*Primary Examiner*—Tim Heitbrink
(74) *Attorney, Agent, or Firm*—Fulbright & Jaworski L.L.P.

(57) ABSTRACT

A mold for injection compression molding, in which an elastic inner cavity with low rigidity and expandable in a direction perpendicular to the mold opening direction is provided in a rigid outer cavity, and when resin is filled in this inner cavity, the inner cavity expands due to a filling pressure of this resin, and when the mold is kept and cooled in a pressurized state, the inner cavity shrinks and a molded product with a desired thickness in a direction perpendicular to the mold opening direction can be obtained.

2 Claims, 4 Drawing Sheets

Prior Art

MOLD FOR INJECTION COMPRESSION MOLDING

FIELD OF THE INVENTION

The present invention relates to a mold for injection compression molding for producing lengthy injection molded products with a flow length in the mold opening direction such as a synthetic resin bottle.

BACKGROUND OF THE INVENTION

In the said injection mold based on the conventional technology, as shown in FIG. 5, a core 22 is movably provided inside a rigid cavity 21 between a closing position and an opening position of the mold, synthetic resin is filled via a gate 24 of a cavity 21 in a gap 23 between the cavity 21 and the core 22, the synthetic resin is kept and cooled in a pressurized state, then the core 22 moves to the mold opening position, and the molded product 25 is taken out from the core 22.

In the injection mold as described above, when a molded product with a large flow length in the mold opening direction, namely with a large flow ratio of a flow length/thickness is molded, increasing thickness when filling is effective to make it easier to fill synthetic resin in the gap 23. The method of utilizing a mold opening to achieve the objective is well known, but in this method, there is the problem that, assuming the mold opening rate DY as shown in FIG. 5, thickness of a bottom surface of a molded product 25 increases by DY, but thickness of a side surface only by DY sin θ, namely that, assuming θ of 5° and DY of 1 mm, thickness of a bottom surface is 1 mm, but that of a side face is 0.09 mm, which is too thin to achieve the thickness effect.

OBJECT AND SUMMARY OF THE INVENTION

It is an object of the present invention to provide a mold for injection compression molding which can overcome the problems in the conventional type of injection compression mold and also can easily produce a molded product with a large flow ratio in the mold opening direction.

To achieve the object as described above, the present invention provides an injection compression mold in which an elastic inner cavity with low rigidity and expandable in a direction perpendicular to the mold opening direction is provided in a rigid outer cavity, and when resin is filled in this inner cavity, the inner cavity expands due to a filling pressure of the resin, and when the mold is kept and cooled in a pressurized state, the inner cavity shrinks, so that a molded product with desired thickness in a direction perpendicular to the mold opening direction can be obtained.

DETAILED DESCRIPTION OF THE PREFERRED EMBODIMENTS

Figure 1:
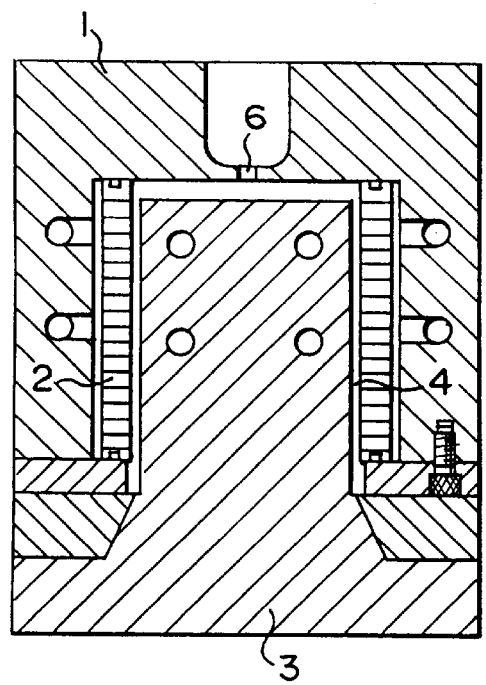
FIG. 1 is a longitudinal cross-sectional view when a mold according to the present invention is closed.
Figure 2:
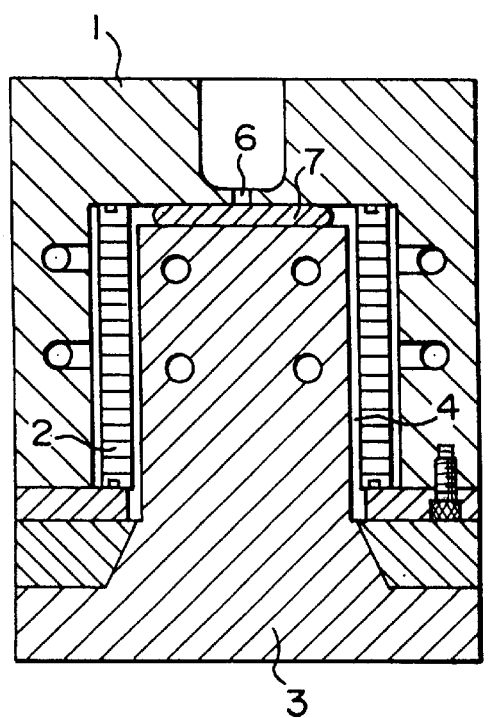
FIG. 2 is a longitudinal cross-sectional view showing a state in the initial state of injection compression molded product.
Figure 3:
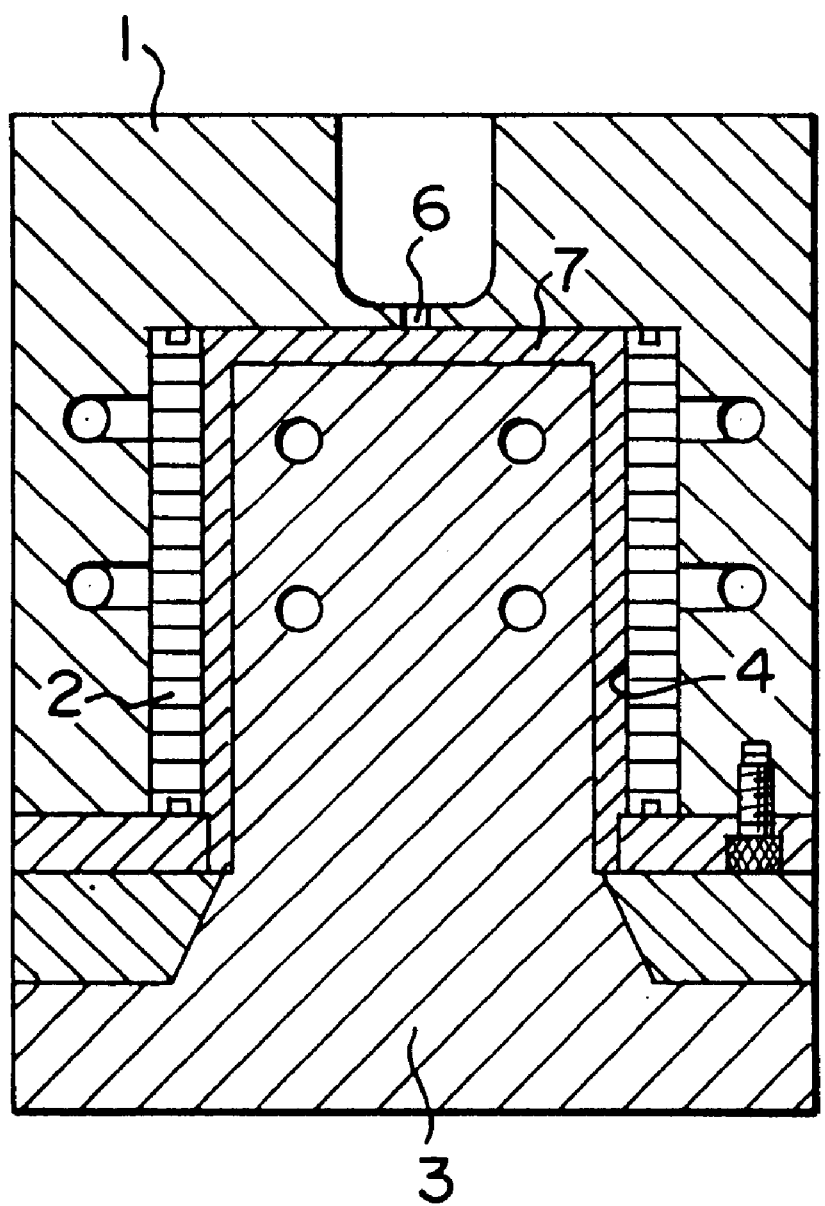
FIG. 3 is a longitudinal cross-sectional view showing a state when the injection compression molded product is finished.
Figure 4:
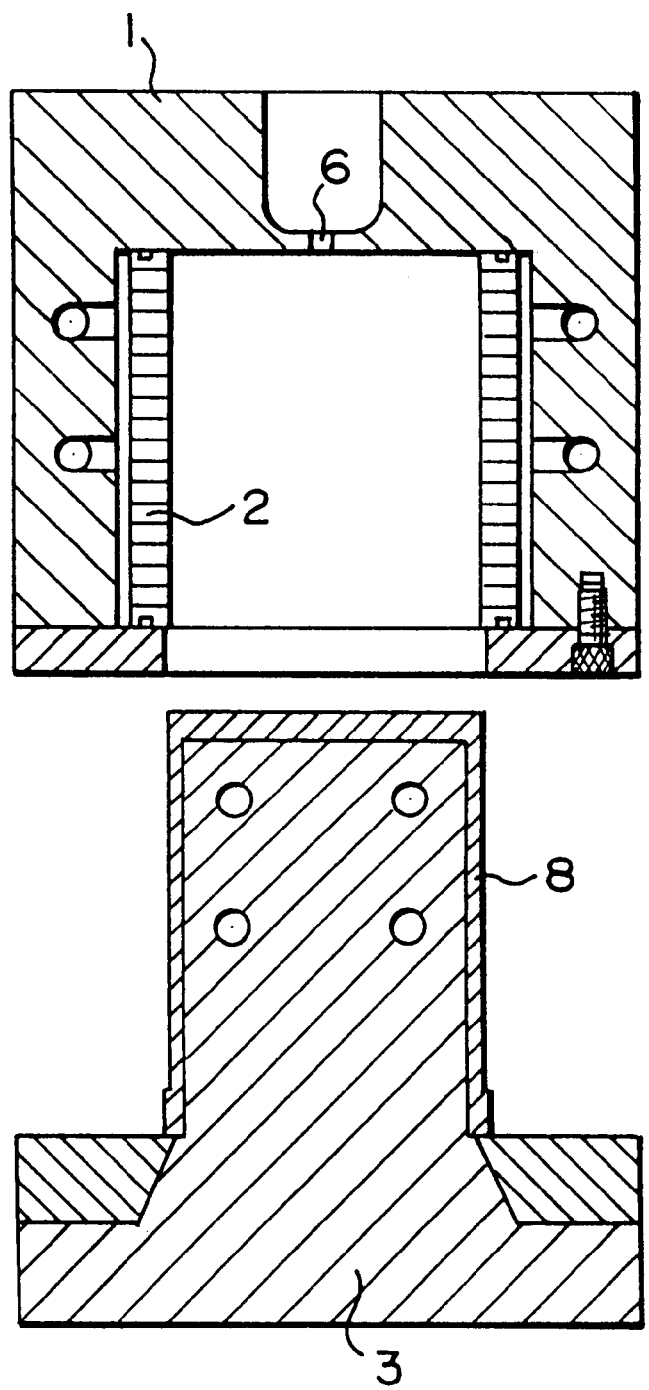
FIG. 4 is a longitudinal cross-sectional view showing a state when the mold is opened.
Figure 5:
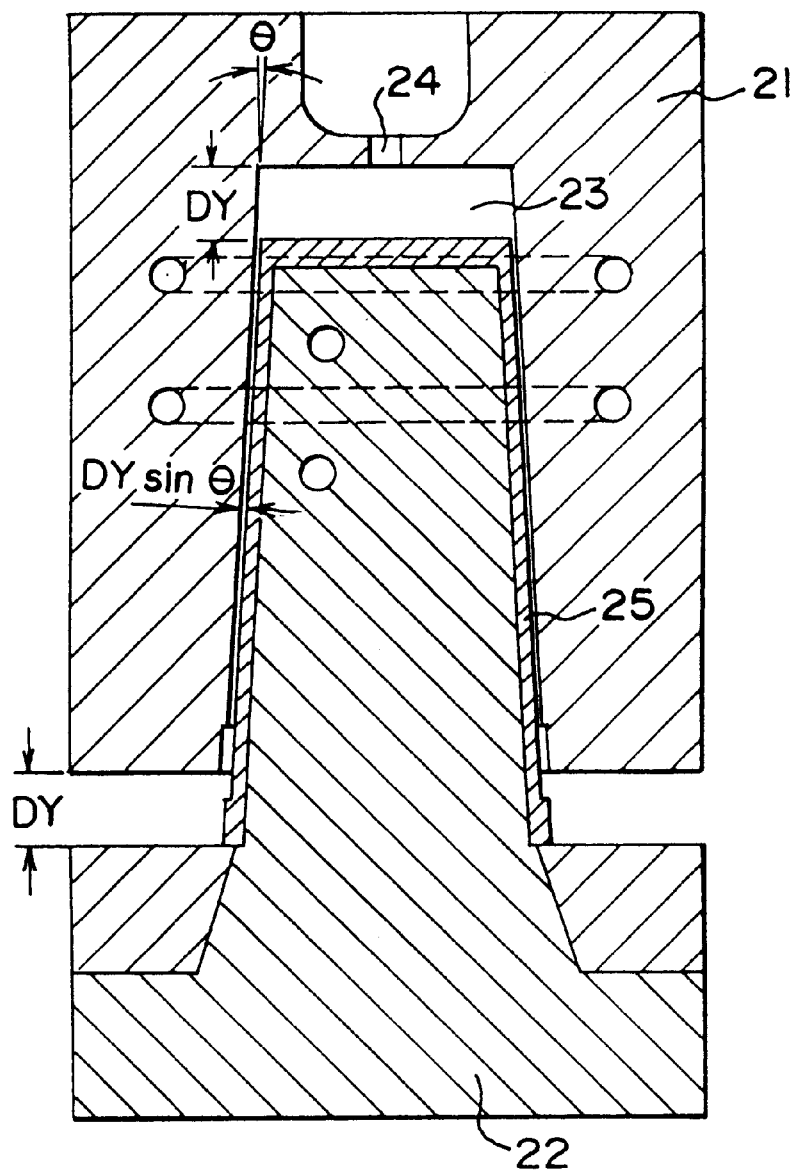
FIG. 5 is a longitudinal cross-sectional view showing the state when the mold is opened in the same type of injection mold based on the conventional type as that according to the present invention.

FIG. 1 to FIG. 4 show an embodiment of the present invention, and in this embodiment, an elastic inner cavity 2 with low rigidity and expandable in a direction perpendicular to the mold opening direction is provided in the rigid outer cavity 1, and a core 3 is movably provided inside the inner cavity 2 between the mold closing position shown in FIG. 1 and mold opening position shown in FIG. 4, and a space 4 for molding is formed between the outer cavity 1, inner cavity 2 and core 3.

When executing injection molding, synthetic resin 7 is filled in the space 4 via a gate 6 of the outer cavity 1 when the mold is in the closed state as shown in FIG. 1. When the synthetic resin is filled, the inner cavity 2 expands in the radial direction as shown in FIG. 3 due to filling of the synthetic resin 7. When filling is finished, the synthetic resin 7 is kept and cooled in a pressurized state. During this cooling step in a pressurized state, the inner cavity 2 shrinks in a direction perpendicular to the mold opening direction due to its elasticity, and a molded product with a desired thickness in a direction perpendicular to the mold opening direction can be obtained.

The present invention provides the injection compression mold as described above, and in this injection compression mold, an elastic inner cavity with low rigidity and expandable in a direction perpendicular to the mold opening direction is provided in a rigid outer cavity, and when resin is filled in this inner cavity, the inner cavity expands due to a filling pressure of this resin, and when the mold is kept and cooled in a pressurized state, and inner cavity shrinks and a molded product with a desired thickness in a direction perpendicular to the mold opening direction can be obtained. Because of this feature, there is provided the advantage that a molded product with a large flow ratio in the direction can easily be produced.

What is claimed is:

1. A mold for injection compression molding, comprising:

a mold having a rigid outer cavity, an elastic inner cavity and an opening;

the elastic inner cavity having low rigidity and being expandable in a direction perpendicular to the direction of the mold opening;

wherein a molded product with a desired thickness in a direction perpendicular to the direction of the mold opening is formed by a) filling the inner cavity with resin resulting in the expansion of the inner cavity due to the filling pressure of the resin; and b) cooling and keeping the mold in a pressurized state in order to shrink the inner cavity.

2. The mold of claim 1, wherein a core is movably provided inside the inner cavity.

* * * * *